(12) United States Patent
Wu

(10) Patent No.: US 12,284,687 B2
(45) Date of Patent: Apr. 22, 2025

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 361 days.

(21) Appl. No.: 17/816,690

(22) Filed: Aug. 1, 2022

(65) Prior Publication Data
US 2022/0369386 A1    Nov. 17, 2022

Related U.S. Application Data

(63) Continuation of application No. PCT/CN2020/120899, filed on Oct. 14, 2020.

(30) Foreign Application Priority Data

Jun. 2, 2020 (CN) .......................... 202010491795.6

(51) Int. Cl.
*H04L 27/26* (2006.01)
*H04W 72/12* (2023.01)
(Continued)

(52) U.S. Cl.
CPC ..... *H04W 74/0841* (2013.01); *H04L 27/2605* (2013.01); *H04W 72/1268* (2013.01); *H04W 74/0866* (2013.01)

(58) Field of Classification Search
CPC .............. H04L 27/2605; H04W 72/04; H04W 72/1268; H04W 74/006; H04W 74/0833; H04W 74/0841; H04W 74/0866
See application file for complete search history.

(56) References Cited

U.S. PATENT DOCUMENTS

2011/0044391 A1   2/2011  Ji et al.
2019/0104554 A1*  4/2019  Amuru ................. H04L 5/0053
(Continued)

FOREIGN PATENT DOCUMENTS

CN      101494476 A      7/2009
CN      103701559 A      4/2014
(Continued)

OTHER PUBLICATIONS

First Office Action of the Chinese application No. 202211554340.X, issued on Jun. 6, 2024. 13 pages with English translation.
(Continued)

*Primary Examiner* — Alpus Hsu
(74) *Attorney, Agent, or Firm* — PERKINS COIE LLP

(57) ABSTRACT

Provided by the present invention is a wireless communication method, a terminal device, and a network device, wherein a terminal device receives first scheduling information sent by a network device, the first scheduling information being used for scheduling transmission of a first uplink channel by the terminal device by means of a first uplink bandwidth part BWP, the first uplink BWP comprising one or multiple resource block RB sets, and the first uplink BWP corresponding to a physical random access channel PRACH resource configuration; the terminal device determines transmission of the first uplink channel by means of a first frequency domain resource in a first RB set according to at least one among the first scheduling information, an initial uplink BWP, and a first PRACH resource in the PRACH resource configuration.

16 Claims, 4 Drawing Sheets

(51) Int. Cl.
  *H04W 72/1268* (2023.01)
  *H04W 74/08* (2024.01)
  *H04W 74/0833* (2024.01)

(56) References Cited

U.S. PATENT DOCUMENTS

| | | | | |
|---|---|---|---|---|
| 2019/0357261 | A1* | 11/2019 | Cirik | H04W 76/11 |
| 2019/0357262 | A1* | 11/2019 | Cirik | H04W 80/02 |
| 2020/0106591 | A1* | 4/2020 | Chen | H04L 5/0092 |
| 2020/0106647 | A1* | 4/2020 | Chen | H04W 72/04 |
| 2020/0228992 | A1* | 7/2020 | Tsai | H04W 72/23 |
| 2021/0168858 | A1* | 6/2021 | Liu | H04W 72/23 |
| 2021/0314987 | A1* | 10/2021 | Ericson | H04W 72/21 |
| 2022/0029659 | A1* | 1/2022 | Liu | H04B 1/7143 |

FOREIGN PATENT DOCUMENTS

| | | | |
|---|---|---|---|
| CN | 107872847 | A | 4/2018 |
| CN | 109997405 | A | 7/2019 |
| CN | 111108714 | A | 5/2020 |
| WO | 2017011802 | A1 | 1/2017 |

OTHER PUBLICATIONS

3GPP TSG RAN WG1 Meeting 90bis—R1-1718576—Prague, CZ, Oct. 9-13, 2017—Qualcomm Incorporated, MPR issue with distributed RB allocation in UL (6 pages).

International Search Report mailed Feb. 1, 2021 of PCT/CN2020/120899 with English translation (4 pages).

Written Opinion mailed Feb. 1, 2021 of PCT/CN2020/120899 with English translation (9 pages).

Search Report of the EP application No. 20938887.5, issued on Apr. 11, 2023. 11 pages.

Moderator(Ericsson), Feature lead summary for Maintenance of UL Signals and Channels,R1-2003842. 3GPP TSG-RAN WG1 Meeting #101-e e-Meeting, May 25-Jun. 5, 2020. 9 pages.

Fujitsu, Remaining issues on UL signals and channels for NR-U,R1-2004041. 3GPP TSG RAN WG1 #101 e-Meeting, May 25-Jun. 5, 2020. 12 pages.

Moderator (Ericsson), FL Summary for [101-e-NR-unilc-NRU-UL Signals Channels-01], R1-2004883. 3GPP TSG-RAN WG1 Meeting #101-e e-Meeting, May 25-Jun. 5, 2020. 26 pages.

* cited by examiner

WIRELESS COMMUNICATION METHOD, TERMINAL DEVICE, AND NETWORK DEVICE

CROSS-REFERENCE TO RELATED APPLICATIONS

The present application is a continuation application of the International PCT Application No. PCT/CN2020/120899, having an international filing date of Oct. 14, 2020, which claims priority to Chinese Patent Application No. 202010491795.6 filed to the China National Intellectual Property Administration (CNIPA) on Jun. 2, 2020 and entitled "Wireless Communication Method, Terminal Device, and Network Device". The contents of the above-identified applications are incorporated into the present application by reference in their entirety.

TECHNICAL FIELD

Embodiments of the present application relate to the field of wireless communication, and more particularly, to a wireless communication method, a terminal device, and a network device.

BACKGROUND

Two-step random access and four-step random access can be supported in a new radio-based access to unlicensed spectrum (NR-U) system. Taking the four-step random access as an example, a network device can configure physical random access channel (PRACH) resources for a terminal device, and the terminal device can select a PRACH resource to send a preamble (also called Message 1 (Msg1)), and further, the network device can send uplink grant information, which is used to instruct the terminal device to determine an uplink resource for transmitting Message 3 (Msg3).

In broadband resource configuration, a concept of resource block (RB) set is introduced. One RB set includes a group of consecutive RBs, one RB set corresponds to at least one LBT bandwidth, and one listen before talk (LBT) bandwidth includes 20 MHz. A network device may configure at least one RB set for a terminal device. In such a case, how a terminal device determines an RB set for uplink transmission in the random access procedure is a problem to be solved urgently.

SUMMARY

The present application provides a wireless communication method, a terminal device and a network device, which are beneficial to ensuring that different terminal devices have a consistent understanding of uplink resource allocation, and the network device and the terminal device have a consistent understanding of uplink resource allocation.

In a first aspect, there is provided a wireless communication method, which includes: a terminal device receives first scheduling information sent by a network device, the first scheduling information being used for scheduling transmission of a first uplink channel by the terminal device through a first uplink bandwidth part (BWP), the first uplink BWP including one or more resource block (RB) sets, and the first uplink BWP corresponding to physical random access channel (PRACH) resource configuration; and the terminal device determines to transmit the first uplink channel through a first frequency domain resource in a first RB set according to at least one of the first scheduling information, an initial uplink BWP, and a first PRACH resource in the PRACH resource configuration.

In a second aspect, there is provided a wireless communication method, which includes: a network device sends first scheduling information to a terminal device, the first scheduling information being used for scheduling transmission of a first uplink channel by the terminal device through a first uplink bandwidth part (BWP), the first uplink BWP including one or more resource block (RB) sets, and the first uplink BWP corresponding to physical random access channel (PRACH) resource configuration, wherein at least one of the first scheduling information, an initial uplink BWP, and a first PRACH resource in the PRACH resource configuration is used for the terminal device to determine to transmit the first uplink channel through a first frequency domain resource in a first RB set.

In a third aspect, there is provided a terminal device configured to perform the method according to the above first aspect or various implementations thereof.

Specifically, the terminal device includes function modules configured to perform the method according to the above first aspect or various implementations thereof.

In a fourth aspect, there is provided a network device configured to perform the method according to the above second aspect or various implementations thereof.

Specifically, the network device includes function modules configured to perform the method according to the above second aspect or various implementations thereof.

In a fifth aspect, there is provided a terminal device including a processor and a memory. The memory is configured to store a computer program, and the processor is configured to call and run the computer program stored in the memory to perform the method according to the above first aspect or various implementations thereof.

In a sixth aspect, there is provided a network device including a processor and a memory. The memory is configured to store a computer program, and the processor is configured to call and run the computer program stored in the memory to perform the method according to the above second aspect or various implementations thereof.

In a seventh aspect, there is provided an apparatus configured to implement the method according to any one of the above first and second aspects or various implementations thereof.

Specifically, the apparatus includes a processor configured to call and run a computer program from a memory to cause a device having the apparatus installed therein to perform the method according to any one of the above first and second aspects or various implementations thereof.

In an eighth aspect, there is provided a computer readable storage medium configured to store a computer program, which causes a computer to perform the method according to any one of the above first and second aspects or various implementations thereof.

In a ninth aspect, there is provided a computer program product including computer program instructions, which cause a computer to perform the method according to any one of the above first and second aspects or various implementation thereof.

In a tenth aspect, there is provided a computer program, which, when running on a computer, causes the computer to perform the method according to any one of the above first and second aspects or various implementations thereof.

Through the technical schemes described above, the terminal device determines the first RB set for transmitting the first uplink channel according to the first scheduling information of the first uplink channel or a specific PRACH resource in the PRACH resource configuration corresponding to the uplink BWP, which is beneficial to ensuring that terminal devices in different stages (e.g., an initial access stage and an RRC connected state stage) have a consistent understanding of uplink resource allocation, and that the network device and the terminal device have a consistent understandings of uplink resource allocation.

DETAILED DESCRIPTION

Technical schemes in embodiments of the present application will be described below in combination with the drawings in the embodiments of the present application. It is apparent that the embodiments described are just some of the embodiments of the present application, but not all of the embodiments of the present application. With regard to the embodiments of the present application, all other embodiments obtained by a person of ordinary skill in the art without making an inventive effort are within the protection scope of the present application.

The technical schemes in the embodiments of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunications System (UMTS), Wireless Local Area Networks (WLANs), Wireless Fidelity (WiFi), a next generation communication system or other communication systems.

Generally speaking, the number of connections supported by traditional communication systems is limited, and the connections are easy to implement. However, with the development of communication technology, mobile communication systems will support not only traditional communication, but also support, for example, Device to Device (D2D) communication, Machine to Machine (M2M) communication, Machine Type Communication (MTC), and Vehicle to Vehicle (V2V) communication, etc. The embodiments of the present application may also be applied to these communication systems.

Optionally, the communication systems in the embodiments of the present application may be applied to a Carrier Aggregation (CA) scenario, or a Dual Connectivity (DC) scenario, or a Standalone (SA) network deployment scenario.

The applied frequency spectrums are not limited in the embodiments of the present application. For example, the embodiments of the present application may be applied to a licensed spectrum and applied to an unlicensed spectrum (or called a shared spectrum).

Figure 1:
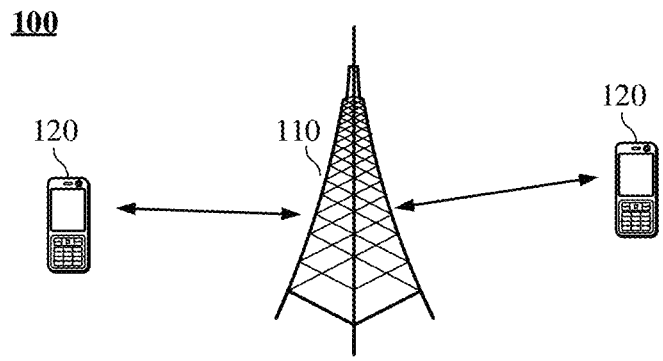
FIG. 1 is a schematic diagram of an architecture of a communication system in accordance with an embodiment of the present application.

Illustratively, a communication system 100 to which the embodiments of the present application are applied is shown in FIG. 1. The communication system 100 may include a network device 110. The network device 110 may be a device that communicates with terminal devices 120 (or referred to as communication terminals or terminals). The network device 110 may provide communication coverage for a specific geographical area, and may communicate with terminal devices located within the coverage area.

FIG. 1 illustrates schematically one network device and two terminal devices. Optionally, the communication system 100 may include a plurality of network devices, and other numbers of terminal devices may be included within the coverage area of each network device, which is not limited in the embodiments of the present application.

Optionally, the communication system 100 may include other network entities, such as a network controller and a mobility management entity, which is not limited in the embodiments of the present application.

It should be understood that a device with a communication function in a network/system in the embodiments of the present application may be referred to as a communication device. Taking the communication system 100 shown in FIG. 1 as an example, communication devices may include a network device 110 and terminal devices 120 which have communication functions, and the network device 110 and the terminal devices 120 may be the specific devices described above, and will not be described repeatedly herein. Communication devices may also include other devices in the communication system 100, for example, other network entities such as a network controller and a mobility management entity, which is not limited in the embodiments of the present application.

It should be understood that the terms "system" and "network" are often used interchangeably herein. The term "and/or" herein describes an association relationship between associated objects only, indicating that there may be three relationships, for example, A and/or B may indicate three cases: A alone, both A and B, and B alone. In addition, the symbol "/" herein generally indicates that there is a "or" relationship between the associated objects before and after "/".

It should be understood that "indicate" mentioned in the embodiments of the present application may mean a direct indication, or an indirect indication, or that there is an association. For example, that A indicates B may mean that A indicates B directly, for example, B can be acquired through A; or it may mean that A indicates B indirectly, for example, A indicates C, and B can be acquired through C; or it may mean that there is an association between A and B.

In the description of the embodiments of the present application, the term "correspond" may mean that there is a directly corresponding or an indirectly corresponding relationship between two parties, or mean that there is an association between two parties, or mean a relationship such as indicating and being indicated, configuring and being configured, etc.

Optionally, configuration parameters or configuration information or configuration signaling in the embodiments of the present application includes at least one of radio resource control (RRC) signaling or a media access control control element (MAC CE).

Various embodiments of the present application are described in combination with a network device and a terminal device, wherein the terminal device may also be referred to as a user equipment (UE), an access terminal, a subscriber unit, a subscriber station, a mobile station, a rover station, a remote station, a remote terminal, a mobile device, a user terminal, a terminal, a wireless communication device, a user agent or a user apparatus. The terminal device may be a station (ST) in a WLAN, or may be a cellular phone, a cordless phone, a Session Initiation Protocol (SIP) phone, a Wireless Local Loop (WLL) station, a Personal Digital Assistant (PDA) device, a handheld device with a wireless communication function, a computing device, or other processing devices connected to a wireless modem, a vehicle-mounted device, a wearable device, and a terminal device in a next generation communication system, such as an NR network or a future evolved Public Land Mobile Network (PLMN).

As an example rather than limitation, in the embodiments of the present application, the terminal device may be a wearable device. The wearable device may also be referred to as a wearable smart device, which is a general term of wearable devices developed by intelligent design on daily wear by applying wearable technology, such as glasses, gloves, a watch, clothing and shoes. The wearable device is a portable device that is worn directly on a body, or integrated into clothes or accessories of users. The wearable device not only is a hardware device, but also implements powerful functions through software support as well as data interaction or cloud interaction. Generalized wearable smart devices include devices such as a smart watch or smart glasses, which are fully functional, have large sizes, and may implement complete or partial functions without relying on smart phones, and devices such as various smart bracelets, smart jewelries or the like for monitoring physical signs, which focus on a certain kind of application functions only and need to be used in conjunction with other devices such as smart phones.

The network device may be a device for communicating with a mobile device, or may be an Access Point (AP) in a WLAN, or a Base Transceiver Station (BTS) in GSM or CDMA, or may be a NodeB (NB) in WCDMA, or an Evolutional Node B (eNB or eNodeB) in LTE, or a relay station or an access point, or a vehicle-mounted device, a wearable device, a network device or a base station (gNB) in an NR network, or a network device in a future evolved PLMN network.

In the embodiments of the present application, the network device may have mobility characteristics, for example, the network device may be a moving device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may be a base station disposed in a position on land or a water region etc.

In the embodiments of the present application, the network device provides services for a cell, and the terminal device communicates with the network device through transmission resources (e.g., frequency domain resources or spectrum resources) used in the cell. The cell may be a cell corresponding to the network device (e.g., a base station). The cell may belong to a macro base station, or a base station corresponding to a Small cell. The Small cell here may include: a Metro cell, a Micro cell, a Pico cell, or a Femto cell, etc. These Small cells have characteristics of small coverage and low transmit power, and are suitable for providing high-speed data transmission services.

An unlicensed spectrum (which may also be referred to as a shared spectrum or a license free spectrum) is a spectrum assigned in countries and regions to be used for communication of radio devices. This spectrum is generally deemed to be a shared spectrum, that is, communication devices in different communication systems may use this spectrum without applying for a proprietary spectrum license from a government, as long as they meet regulatory requirements set in the countries or regions on this spectrum.

In order to enable various communication systems, which carry out wireless communication by using the unlicensed spectrum, to coexist friendly on this spectrum, regulatory requirements which must be met for using the unlicensed spectrum have been stipulated in some countries or regions. For example, communication devices follow a "Listen Before Talk (LBT)" principle, that is, before a communication device transmits signals on a channel of the unlicensed spectrum, the communication device needs to carry out channel listening first, and the communication device can transmit the signals only when a result of the channel listening is that the channel is idle. If the result of the channel listening of the communication device on the channel of the unlicensed spectrum is that the channel is busy, the communication device cannot transmit the signals. In order to guarantee fairness, in one transmission, a duration in which a communication device transmits signals by using the channel of the unlicensed spectrum cannot exceed a maximum channel occupancy time (MCOT).

As another example, in order to both avoid sub-band interference to the signals transmitted on the channel of the unlicensed spectrum and improve detection accuracy of the communication device when detecting the channel of the unlicensed spectrum, the signals transmitted on the channel of the unlicensed spectrum need to occupy at least a certain proportion of a bandwidth of the channel. For example, in a 5 GHz band, signals occupy 80% of the channel bandwidth, and in a 60 GHz band, signals occupy 70% of the channel bandwidth. Taking 20 MHz as an example, if a requirement that signals occupy 80% of the channel bandwidth is to be met, then the bandwidth occupied by the signals should be at least 16 MHz.

As another example, in order to avoid that a power of the signals transmitted on the channel of the unlicensed spectrum is too high and affects transmission of other important signals, such as radar signals, on the channel, there are laws and regulations stipulating the maximum power and the maximum power spectral density when communication devices transmit signals by using the channel of the unlicensed spectrum.

In order to facilitate understanding of the technical schemes of the embodiments of the present application, the technical schemes of the present application will be described in detail below through specific embodiments. The following related technologies, which, as alternative schemes, may be arbitrarily combined with the technical schemes of the embodiments of the present application, and the combination should be within the protection scope of the embodiments of the present application. The embodiments of the present application include at least part of the following contents.

A four-step random access procedure and a two-step random access procedure based on contention may be supported in an NR-U system.

Specifically, four-step random access includes the following steps.

In step 1, a terminal device sends a random access preamble, i.e., Msg1, to a network device.

The random access preamble may also be referred to as a preamble, a random access preamble sequence, a preamble sequence, etc.

Specifically, the terminal device may select a physical random access channel (PRACH) resource, which may include a time domain resource, a frequency domain resource and a code domain resource.

In step 2, the network device sends a random access response (RAR), i.e., Msg2, to the terminal device. The RAR can notify the terminal device of information of an uplink resource that can be used when transmitting Msg3, assign a temporary cell radio network temporary identity (TC-RNTI) to the terminal device, and provide a timing advance (TA) command to the terminal device.

After the terminal device sends the preamble to the network device, it can open a random access response window (ra-ResponseWindow), detect a physical downlink control channel (PDCCH) in the ra-ResponseWindow, and obtain a physical downlink shared channel (PDSCH) scheduled by the PDCCH. The PDSCH includes the RAR corresponding to the preamble.

In step 3, the terminal device sends Msg3.

After receiving the RAR message, the terminal device determines whether the RAR is an RAR message directed to itself. For example, the terminal device can check with a preamble index, and send the Msg3 in an uplink resource specified in the RAR message after determining that it is an RAR message directed to itself; or after transmitting the Msg3, the terminal device can retransmit the Msg3 when detecting that there is an uplink grant for scheduling retransmission of the Msg3. The Msg3 is transmitted through a physical uplink shared channel (PUSCH) and is called Msg3-PUSCH.

Optionally, if uplink transmission of the Msg3 is failed, the network device may schedule retransmission of the Msg3 for the terminal device through a TC-RNTI scrambled uplink grant.

In step 4, the network device sends Msg4, including a contention resolution message, to the terminal device.

Optionally, if downlink transmission of the Msg4 is failed, the network device may schedule retransmission of the Msg4 for the terminal device through a TC-RNTI scrambled downlink grant.

Further, after receiving the downlink grant corresponding to the Msg4, the terminal device feeds back hybrid automatic repeat request acknowledgement (HARQ-ACK) information corresponding to the Msg4 on a corresponding PUCCH resource.

The two-step random access procedure is as follows.

In step 1, a terminal device sends message A (i.e., MsgA) to a network device via a PRACH and a PUSCH.

The MsgA contains a preamble transmitted on the PRACH and a MsgA-PUSCH. After the MsgA is transmitted, the terminal device monitors a response from the network side in a configured window.

In step 2, after receiving the MsgA, the network device sends a random access response, i.e., message B (MsgB), to the terminal device.

After receiving a scheduling corresponding to the MsgB, the terminal device feeds back HARQ-ACK information corresponding to the MsgB on a corresponding physical uplink control channel (PUCCH) resource.

The terminal device determines frequency domain positions of PRACH resources (also known as RO resources or RACH occasions) according to a frequency domain starting position configuration parameter of the PRACH resources (e.g., a high-layer parameter msg1-FrequencyStart or msgA-RO-FrequencyStart) notified by the network device. Specifically, the frequency domain starting position configuration parameter is used to indicate a frequency domain offset of the first PRACH resource in the frequency domain in an uplink BWP (e.g., an initial uplink BWP or an active uplink BWP) relative to the first PRB (i.e., PRB 0) of the uplink BWP. The network device may also notify the number of PRACH resources of frequency division multiplexing (FDM) on a same time unit through a high-layer parameter (e.g., msg1-FDM or msgA-RO-FDM). The terminal device can determine the frequency domain positions of the PRACH resources included in the uplink BWP according to the frequency domain starting position configuration parameter and the number of PRACH resources of FDM.

Figure 2:
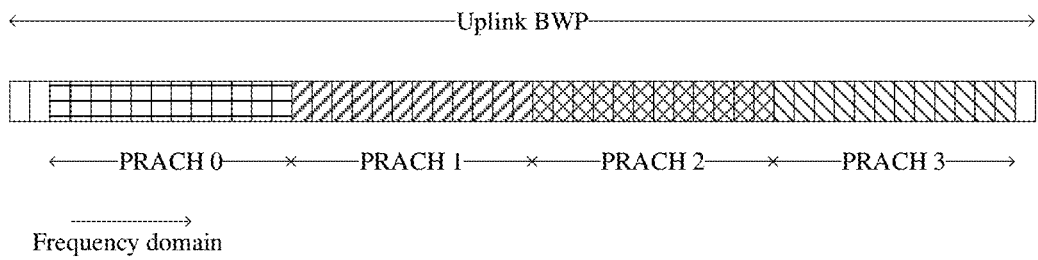
FIG. 2 is a schematic diagram of PRACH resource configuration in accordance with an embodiment of the present application.

For example, on an uplink BWP, the terminal device determines that a frequency domain starting position offset value is 2, the number of RBs occupied by one PRACH resource is 12 and the number of PRACH resources of FDM is 4 according to indication information of the network device, then the terminal device can determine the four PRACH resources included in the uplink BWP, as shown in FIG. 2.

Because the size of a unit channel bandwidth during the LBT of a communication device on the shared spectrum may include 20 MHz, and because the requirement for channel occupation bandwidth needs to be met during signal transmission, a long PRACH sequence is introduced in the NR-U system. In the case that the PRACH has a subcarrier spacing (SCS) of 15 kHz, the length of the PRACH sequence is 1151, and in the case that the PRACH has a subcarrier spacing (SCS) of 30 kHz, the length of the PRACH sequence is 571.

Combinations of PRACH subcarrier spacings and PUSCH subcarrier spacings supported on the shared spectrum and the numbers of RBs occupied by one corresponding PRACH resource are shown in Table 1 below. Herein, the number of RBs occupied by the PRACH is expressed by taking an RB of the PUSCH as a unit.

TABLE 1

| Length of PRACH sequence | PRACH subcarrier spacing (kHz) | PUSCH subcarrier spacing (kHz) | Number of RBs occupied by PRACH |
| --- | --- | --- | --- |
| 139 | 15 | 15 | 12 |
| 139 | 15 | 30 | 6 |
| 139 | 15 | 60 | 3 |
| 139 | 30 | 15 | 24 |
| 139 | 30 | 30 | 12 |
| 139 | 30 | 60 | 6 |
| 571 | 30 | 15 | 96 |
| 571 | 30 | 30 | 48 |
| 571 | 30 | 60 | 24 |
| 1151 | 15 | 15 | 96 |
| 1151 | 15 | 30 | 48 |
| 1151 | 15 | 60 | 24 |

In broadband resource configuration, a concept of RB set is introduced. One RB set includes a group of consecutive RBs, and one RB set corresponds to an integer number of LBT bandwidths, such as one LBT bandwidth, which is 20 MHz. The network device may configure at least one RB set for the terminal device. When the network device configures a plurality of RB sets included within a carrier for the terminal device, a guard band within the carrier may be included between two adjacent RB sets. The guard band within the carrier includes an integer number of RBs. The carrier may be an uplink carrier or a downlink carrier of the terminal device. In an alternative case, the size of the guard band within the carrier is acquired according to a protocol. In another alternative case, the guard band within the carrier is acquired according to configuration parameters of the network device, such as starting positions of the RB sets configured by the network device and the number of RBs included in an RB set. Or, when the network device configures a plurality of RB sets for the terminal device, there may be no guard band within the carrier between two adjacent RB sets. In such a case, the terminal device may determine that the number of RBs included in the guard band within the carrier is 0. Optionally, the configured or activated BWP of the terminal device completely overlaps with at least one RB set. Optionally, the configured or activated BWP of the terminal device may partially overlap with at least one RB set.

In an initial access stage, the transmission in the random access procedure occurs on an initial bandwidth part (BWP). If the uplink BWP only includes 20 MHz, or the uplink BWP only includes one RB set, then the PRACH, initial transmission of Msg3 PUSCH, retransmission of Msg3 PUSCH or PUCCH transmission corresponding to Msg4 can occur in the same RB set.

In an RRC connected state, the active uplink BWP of the terminal device may be UE-specific configured, but the PRACH resources are cell-specific configured. For different terminal devices, the size of an RB set corresponding to a PRACH resource may be different, thus different terminal devices may have ambiguity in understanding resources allocated by the network device. In addition, because a plurality of RB sets may be included in one BWP, how to carry out uplink transmission in the random access procedure in these cases is a problem to be solved urgently.

Based on the above problems, the present application provides an uplink resource allocation scheme used in the random access procedure, which enables different terminal devices in the RRC connected state to determine the RB set and the bandwidth used for transmitting the uplink channel in the random access procedure, thereby avoiding ambiguity in the understanding of the network device and the terminal device.

In the NR-U system, a resource allocation mode based on an interlace structure is introduced in the uplink transmission. For a subcarrier spacing of 15 kHz, 10 interlaces (i.e., M=10) are included, indexes of which are 0 to 9; for a subcarrier spacing of 30 kHz, 5 interlaces (i.e., M=5) are included, indexes of which are 0 to 4. The interlace structure is defined as follows: interlace 0 is defined from common resource block (CRB) 0 according to a CRB grid, and a frequency domain spacing between two adjacent resource blocks (RBs) in RBs included in each interlace is M RBs.

When the terminal device is configured with interlace-based uplink transmission, a manner of allocating a frequency domain resource by the network device to the terminal device includes: if an uplink BWP includes one or more RB sets, for interlace-based PUSCH transmission on the uplink BWP, a frequency domain resource allocation (FURA) field in grant information of a frequency domain resource allocated to the PUSCH includes (X+Y) bits, wherein X bits are used to indicate indexes of the assigned interlaces, and Y bits are used to indicate which RB set or which RB sets in the uplink BWP are allocated to the terminal device. However, in the random access procedure, when the network device allocates a PUSCH resource for transmitting Msg3 to the terminal device through RAR grant information or through TC-RNTI scrambled grant information, the grant information may only include X bits for indicating the indexes of the assigned interlaces and does not include Y bits for indicating the RB set in the uplink BWP. Thus, in this case, the terminal device needs to determine through other manners which RB set or which RB sets in the uplink BWP are allocated for uplink transmission.

Figure 3:
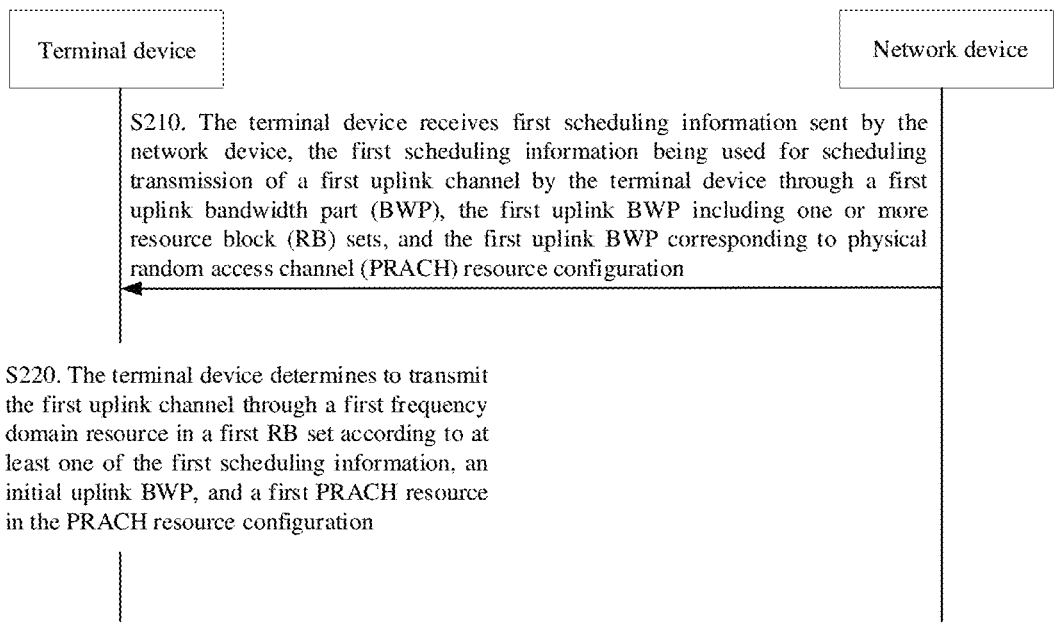
FIG. 3 is a schematic diagram of interaction in a wireless communication method in accordance with an embodiment of the present application.

FIG. 3 is a schematic diagram of interaction in a wireless communication method 200 in accordance with an embodiment of the present application. As shown in FIG. 3, the method 200 may include at least part of the following contents.

In S210, a terminal device receives first scheduling information sent by a network device, the first scheduling information being used for scheduling transmission of a first uplink channel by the terminal device through a first uplink bandwidth part (BWP), the first uplink BWP including one or more resource block (RB) sets, and the first uplink BWP corresponding to physical random access channel (PRACH) resource configuration.

In S220, the terminal device determines to transmit the first uplink channel through a first frequency domain resource in a first RB set according to at least one of the first scheduling information, an initial uplink BWP and a first PRACH resource in the PRACH resource configuration.

Optionally, one or more RB sets are included in the first uplink BWP. If a plurality of RB sets are included in the BWP, a guard band within a carrier is included between two adjacent RB sets of the plurality of RB sets, or no guard band within the carrier is included between two adjacent RB sets of the plurality of RB sets.

Optionally, the first uplink BWP may include the initial uplink BWP, or may also include an active uplink BWP in an RRC connected state.

Optionally, the terminal device determines a guard band included in the first uplink BWP according to guard band configuration information of the network device or according to preset information (e.g., specified in a protocol). The guard band may include the guard band within the carrier, or the number of RBs included in the guard band may be 0, i.e., no guard band within the carrier is included.

In one case, the size of the guard band within the carrier is acquired according to the protocol. In another case, the guard band within the carrier is acquired according to configuration parameters of the network device. For example, the network device indicates a starting position of the guard band within the carrier and the number of RBs included in the guard band.

As an example, configuration parameters of the guard band are shown as follows:

```
IntraCellGuardBand-r16 ::=      SEQUENCE (SIZE (1.ffsValue)) OF GuardBand-r16 -- FFS
upper size 4, assuming 100Mhz cell
GuardBand-r16           ::= SEQUENCE {
    startCRB-r16            INTEGER (0.ffsValue), --FFS upper range 275
    nrofCRBs-r16            INTEGER (0.ffsValue)
}
```

Optionally, the configuration parameters of the guard band are UE-specific configuration signaling.

Optionally, the configuration parameters of the guard band are cell-specific configuration signaling.

Optionally, the configuration parameters of the guard band are configured in at least one of the following RRC configuration parameters: BWP-UplinkDedicated, BWP-DownlinkDedicated, ServingCellConfigCommon, BWP-UplinkCommon, and BWP-DownlinkCommon.

It should be noted that in the embodiment of the present application, the first uplink BWP corresponding to the physical random access channel (PRACH) resource configuration may mean that PRACH resources on the first uplink BWP are determined according to the PRACH resource configuration, or the first uplink BWP is an uplink BWP configured with PRACH resources, or configuration parameters of the first uplink BWP include a configuration parameter used for the random access procedure. Further optionally, PUSCH resources, such as PUSCHs for transmitting the MsgA in the two-step random access procedure or called MsgA-PUSCH resources, may also be determined.

Optionally, in the embodiment of the present application, the PRACH resource configuration may include a first configuration parameter and/or a second configuration parameter. The first configuration parameter is used for the terminal device to determine frequency domain positions of PRACH resources (also referred to as RACH occasions (ROs) or RACH transmission opportunities) in the first uplink BWP. The second configuration parameter is used for the terminal device to determine frequency domain positions of MsgA-PUSCH resources (also referred to as PUSCH occasions (POs) or MsgA-PUSCH transmission opportunities) in the first uplink BWP.

Optionally, the first configuration parameter may include a frequency domain starting position configuration parameter of the PRACH resources (e.g., a high-layer parameter msg1-FrequencyStart or msgA-RO-FrequencyStart) and/or the number of PRACH resources of frequency-division multiplexing (FDM) on the same time unit (e.g., msg1-FDM or msgA-RO-FDM). The terminal device can determine the frequency domain positions of the PRACH resources included in the uplink BWP according to the frequency domain initial position configuration parameter of the PRACH resources and the number of PRACH resources of FDM.

For example, the frequency domain starting position configuration parameter of the PRACH resources includes a first frequency domain starting position configuration parameter for indicating a frequency domain offset of the first PRACH resource in the frequency domain in an uplink BWP (e.g., the initial uplink BWP or the active uplink BWP) relative to the first physical resource block (PRB), i.e., PRB 0, of the uplink BWP.

Optionally, the second configuration parameter may include a frequency domain starting position configuration parameter of the PUSCH resources (e.g., frequencyStartMsgA-PUSCH-r16) and/or the number of PO resources of frequency division multiplexing (FDM) on the same time unit (e.g., nrofMsgA-PO-FDM-r16). Further, the terminal device can determine frequency domain positions of the PO resources included in the uplink BWP according to the frequency domain starting position configuration parameter of the PUSCH resources and the number of PO resources of FDM.

For example, the frequency domain starting position configuration parameter of the PUSCH resources is used for indicating a frequency domain offset of the first PO resource in the frequency domain in an uplink BWP relative to the first PRB, i.e., PRB 0, of the uplink BWP.

It should be understood that parameters used in the random access procedure are cell-specific configured in the communication system. For example, the parameters used in the random access procedure in an uplink BWP can be configured through a high-layer signaling (e.g., BWP-UplinkCommon). The network device can transmit the cell-specific configured parameters to the terminal device through a common radio resource control (RRC) signaling or a dedicated RRC signaling. If the cell-specific configured parameters are sent to the terminal device through the dedicated RRC signaling, the network device needs to ensure that different terminal devices in the cell have a consistent understanding of the cell-specific configured parameters. Optionally, for a primary cell, the network device may send the cell-specific configured parameters on the initial uplink BWP to the terminal device through system information, and for other serving cells, the network device may send the cell-specific configured parameters to the terminal device through the dedicated signaling.

Optionally, because the parameters used in the random access procedure, such as the PRACH resources and the MsgA-PUSCH resources, are cell-specific configured, and uplink BWPs of different terminal devices are UE-specific configured in the RRC connected state, the network device needs to satisfy at least one of the following conditions when configuring the uplink BWPs including the PRACH resources for the terminal devices:

1. Starting points of the uplink BWPs of the different terminal devices are the same. Therefore, the different terminal devices can determine the frequency domain positions of the PRACH resources included in the uplink BWPs through the frequency domain starting position configuration parameter of the PRACH resources and the number of PRACH resources of FDM.

2. The uplink BWPs of the different terminal devices need to include all the PRACH resources. Therefore, in this case, the different terminal devices have a consistent understanding of a mapping relationship between SSB resources and the PRACH resources.

Figure 4:
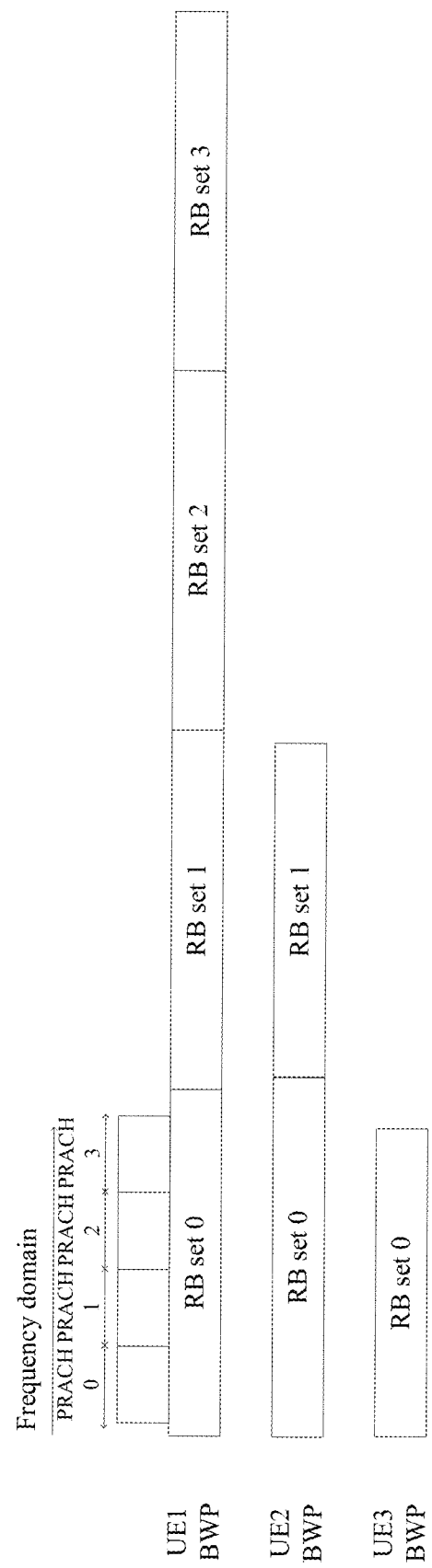
FIG. 4 is a schematic diagram of PRACH resources and uplink BWP configuration.

An example of the above configuration is given in FIG. 4.

As shown in FIG. 4, for UE1, four RB sets (RB set 0 to RB set 3) are included in the uplink BWP, wherein four PRACH resources (PRACH resource 0 to PRACH resource 3) are included in the RB set 0; for UE2, two RB sets (RB set 0 to RB set 1) are included in the uplink BWP, wherein four PRACH resources are included in the RB set 0; for UE3, one RB set (RB set 0) is included in the uplink BWP, wherein four PRACH resources are included in the RB set 0.

Because the uplink BWPs of different UEs may be UE-specific configured, the number of RBs included in the RB set 0 may be the same or different for the different UEs. Thus, when uplink transmission is carried out, there will be ambiguity in different UEs' interpretation of allocated uplink resources, resulting in inconsistency in understandings of the network device and the terminal device.

In the embodiment of the present application, the first RB set for transmitting the first uplink channel may be determined according to at least one of the first scheduling information, information of the initial uplink BWP and the first PRACH resource in the PRACH resource configuration, and further, the first frequency domain resource in the first RB set may be determined to transmit the first uplink channel/signal.

Therefore, the first RB set is a candidate frequency domain resource set for transmitting the first uplink channel. The first RB set may include one RB set or a plurality of RB sets, i.e., the first uplink channel may be transmitted through a frequency domain resource in one RB set; or the first uplink channel may be transmitted through frequency domain resources in a plurality of RB sets. In other words, the first frequency domain resource may include a frequency domain resource in one RB set or frequency domain resources in a plurality of RB sets.

The first uplink channel is used for uplink transmission in the random access procedure or uplink transmission related to the random access procedure, for example, uplink transmission of HARQ-ACK feedback information corresponding to Msg4.

Optionally, the first uplink channel includes at least one of: a message 3-physical uplink shared channel (Msg3-PUSCH) and a physical uplink control channel (PUCCH).

Optionally, the first scheduling information includes frequency domain resource allocation information used for indicating resource allocation determined according to the first RB set.

Optionally, the frequency domain resource allocation information includes interlace index indication information indicating a first interlace, and the first frequency domain resource includes an RB, which overlaps with the first interlace, in the first RB set.

The first scheduling information is used for scheduling uplink transmission in the random access procedure or uplink transmission related to the random access procedure, for example, uplink transmission of HARQ-ACK feedback information corresponding to Msg4.

Optionally, the first scheduling information includes at least one of: uplink grant information in a random access response (RAR), temporary cell radio network temporary identity (TC-RNTI) scrambled uplink grant information, and TC-RNTI scrambled downlink grant information.

Optionally, the uplink grant information in the RAR may be used for scheduling initial transmission of Msg3-PUSCH. For example, the uplink grant information includes an RAR uplink grant.

Optionally, the TC-RNTI scrambled uplink grant information may be used for scheduling retransmission of Msg3-PUSCH. For example, the uplink grant information includes TC-RNTI scrambled DCI format 0_0.

Optionally, the TC-RNTI scrambled downlink grant information is used for scheduling the HARQ-ACK information corresponding to Msg4. For example, the downlink grant information includes TC-RNTI scrambled DCI format 1_0.

Optionally, the first scheduling information may include information of the first uplink BWP.

In some embodiments, the terminal device may determine the first RB set for transmitting the first uplink channel according to the first scheduling information.

Optionally, determining by the terminal device the first RB set for transmitting the first uplink channel according to the first scheduling information may include: determining a starting position of the first RB set and/or the number of RBs included in the first RB set according to the first scheduling information.

In some embodiments, the terminal device may determine frequency domain resource allocation in the first RB set for transmitting the first uplink channel according to the first scheduling information.

In one embodiment, the terminal device may determine the starting position of the first RB set and/or the number of RBs included in the first RB set according to whether the first uplink BWP includes the initial uplink BWP.

For example, if the first uplink BWP includes the initial uplink BWP, it can be determined that the first RB set is the RB set included in the initial uplink BWP. That is, the starting position of the first RB set and the number of RBs included in the first RB set are the same as the starting position of the RB set included in the initial uplink BWP and the number of RBs included in the RB set included in the initial uplink BWP.

As another example, if the first uplink BWP does not include the initial uplink BWP, the terminal device may determine the first RB set according to another preset rule. As an example, the first RB set includes the first one RB set, e.g., RB set 0, in the first uplink BWP.

Optionally, that the first uplink BWP includes the initial uplink BWP may mean that a subcarrier spacing and a cyclic prefix (CP) corresponding to the first uplink BWP are the same as a subcarrier spacing and a CP corresponding to the initial uplink BWP, and RBs in the first uplink BWP include RBs in the initial uplink BWP.

Optionally, that the first uplink BWP does not include the initial uplink BWP may mean that: the subcarrier spacing corresponding to the first uplink BWP is different from the subcarrier spacing corresponding to the initial uplink BWP, or the CP corresponding to the first uplink BWP is different from the CP corresponding to the initial uplink BWP, or the RBs in the first uplink BWP do not include at least one of the RBs in the initial uplink BWP.

Optionally, in some cases, the PRACH resources are located within at least two RB sets in the first uplink BWP (i.e., PRACH resources across RB sets), or RBs corresponding to the PRACH resources overlap with RBs included in a guard band in the first uplink BWP in frequency domain (in other words, the PRACH resources are at least partially located on the guard band), or at least one PRACH resource included in the first uplink BWP overlaps with RBs included in two RB sets in frequency domain. In these cases, the problem that the understandings of allocated uplink resources of the network device and the terminal device are inconsistent may also occur.

In some other embodiments, the terminal device may determine the first RB set according to the first PRACH resource in the PRACH resource configuration corresponding to the first uplink BWP.

Optionally, the first PRACH resource may be a specific PRACH resource in the PRACH resource configuration, which is not limited in the present application.

As an example rather than limitation, the first PRACH resource includes the first one PRACH resource in the PRACH resource configuration; or the first PRACH resource includes the last one PRACH resource in the PRACH resource configuration; or the first PRACH resource includes a PRACH resource for transmitting the PRACH by the terminal device, i.e., the first RPACH resource includes a PRACH resource for transmitting Msg1.

Optionally, the starting position of the first RB set is determined according to a starting position of an RB set corresponding to the first PRACH resource. For example, the starting position of the first RB set is the same as the starting position of the RB set corresponding to the first PRACH resource.

Optionally, the number of RBs included in the first RB set is determined according to the number of RBs included in the RB set corresponding to the first PRACH resource.

Optionally, the terminal device may determine the first RB set according to a RB set corresponding to a first RB in the first PRACH resource.

In some embodiments, that the terminal device determines the first RB set according to the RB set corresponding to the first RB in the first PRACH resource may include: the terminal device determines the starting position of the first RB set according to a starting position of the RB set corresponding to the first RB in the first PRACH resource, and/or determines the number of RBs included in the first RB set according to the number of RBs included in the RB set corresponding to the first RB in the first PRACH resource.

Optionally, the starting position of the first RB set is determined according to a starting position of the first PRACH resource. For example, the starting position of the first RB set is the same as the starting position of the first PRACH resource.

Optionally, the starting position of the first RB set is determined according to a position of the first RB in the first PRACH resource. For example, the starting position of the first RB set is the same as the position of the first RB in the first PRACH resource.

Optionally, the starting position of the RB set corresponding to the first RB may be determined as the starting position of the first RB set.

Optionally, the number of RBs included in the RB set corresponding to the first RB may be determined as the number of RBs included in the first RB set.

Optionally, the terminal device may determine the number of RBs included in the first RB set according to another agreed rule.

Optionally, the number of RBs included in the first RB set is determined according to the number of RBs included in the initial uplink BWP, for example, the number of RBs included in the initial uplink BWP is determined as the number of RBs included in the first RB set.

Optionally, the number of RBs included in the first RB set is determined according to a preset value, for example, the number of RBs included in the first RB set is determined to be the preset value, and the size of the preset value is not limited in the present application.

Optionally, the preset value is associated with the subcarrier spacing. For example, if the subcarrier spacing corresponding to the first uplink BWP is 30 kHz, the preset value may be 51. As another example, if the subcarrier spacing corresponding to the first uplink BWP is 15 kHz, the preset value may be 106. As another example, if the subcarrier spacing corresponding to the first uplink BWP is 60 kHz, the preset value may be 24.

Optionally, the number of RBs included in the first RB set is determined according to a configuration parameter of the network device. For example, the number of RBs configured by the network device may be determined as the number of RBs included in the first RB set.

It should be understood that the first RB may be an RB at a specific position in the first PRACH resource, which is not limited in the present application.

In some examples, the first RB includes the first one RB of the first PRACH resource; or the first RBs includes the last one RB of the first PRACH resource; or the first RB includes the first one RB, which overlaps with an RB set, in the first PRACH resource; or the first RB includes the last one RB, which overlaps with an RB set, in the first PRACH resource.

Optionally, if the first uplink BWP includes a plurality of RB sets, a first guard band is included between two adjacent RB sets of the plurality of RB sets, and the first RB does not overlap with the first guard band in the frequency domain.

By configuring different terminal devices to determine the RB set for transmitting the first uplink channel based on the same rule, it can be ensured that the network device and the terminal device have a consistent understanding of the first frequency domain resource for transmitting the first uplink channel.

Figure 5:
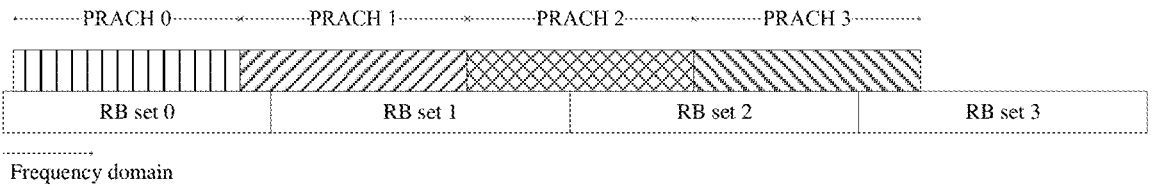
FIG. 5 is a schematic diagram of a PRACH resource configuration across RB sets.

For example, as shown in FIG. 5, the first uplink BWP corresponds to four PRACH resources (PRACH resources 0 to 3), and the terminal device can determine that a starting position of the first one RB in PRACH resource 0 or a starting position of an RB set corresponding to PRACH resource 0 is the starting position of the first RB set, i.e., the starting position of RB set 0. In addition, the terminal device may determine that the number of RBs included in the first RB set is the same as the number of RBs included in the initial uplink BWP. That is, in this example, the starting position of the first RB set is the starting position of RB set 0, and the length of the first RB set is the length of the initial uplink BWP.

Figure 6:
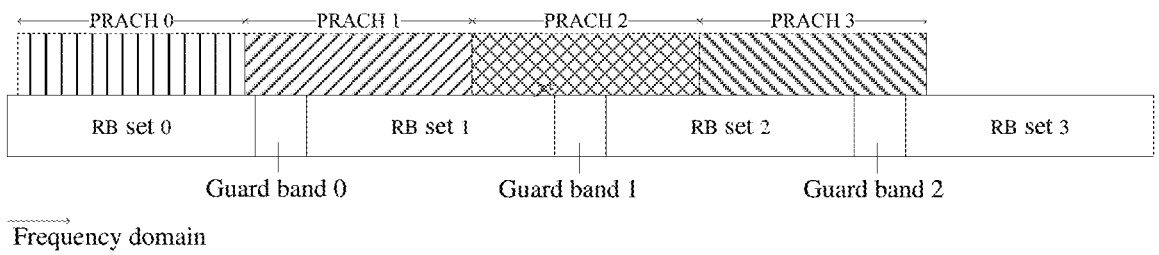
FIG. 6 is a schematic diagram of another PRACH resource configuration across RB sets.

As another example, as shown in FIG. 6, the first uplink BWP corresponds to four PRACH resources (PRACH resources 0 to 3), PRACH2 is a PRACH resource for transmitting Msg1, and the terminal device can determine that a starting position of an RB set corresponding to the first one RB in PRACH resource 2 is the starting position of the first RB set, i.e., the starting position of RB set 2. In addition, the terminal device may determine that the number of RBs included in the first RB set is the same as the number of RBs included in the initial uplink BWP. That is, in this example, the starting position of the first RB set is the starting position of RB set 2, and the length of the first RB set is the length of the initial uplink BWP.

Optionally, the first guard band may include one guard band or a plurality of guard bands.

Optionally, one RB set corresponds to one LBT bandwidth, or one RB set corresponds to a 20 MHz bandwidth.

Therefore, in the embodiment of that present application, the terminal device determines the first RB set for transmitting the first uplink channel according to the first scheduling information of the first uplink channel or a specific PRACH resource in the PRACH resource configuration corresponding to the uplink BWP, which is beneficial to ensuring that terminal devices in different stages (e.g., an initial access stage and an RRC connected state stage) have a consistent understanding of uplink resource allocation, and that the network device and the terminal device have a consistent understanding of uplink resource allocation.

Method embodiments of the present application are described in detail above in combination with FIGS. 3 to 6, and device embodiments of the present application will be described in detail below in combination with FIGS. 7 to 11. It should be understood that the device embodiments correspond to the method embodiments and can be described with reference to the method embodiments.

Figure 7:
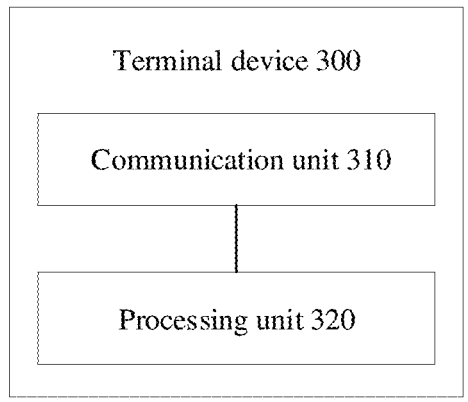
FIG. 7 is a schematic block diagram of a terminal device in accordance with an embodiment of the present application.

FIG. 7 shows a schematic block diagram of a terminal device 300 in accordance with an embodiment of the present application. As shown in FIG. 7, the terminal device 300 includes: a communication unit 310 configured to receive first scheduling information sent by a network device, the first scheduling information being used for scheduling transmission of a first uplink channel by the terminal device through a first uplink bandwidth part (BWP), the first uplink BWP including one or more resource block (RB) sets, and the first uplink BWP corresponding to physical random access channel (PRACH) resource configuration; and a processing unit configured to determine to transmit the first uplink channel through a first frequency domain resource in a first RB set according to at least one of the first scheduling information, an initial uplink BWP and a first PRACH resource in the PRACH resource configuration.

Optionally, the first RB set is determined according to the first PRACH resource; or, if the first uplink BWP includes the initial uplink BWP, the first RB set is an RB set included in the initial uplink BWP.

Optionally, the first RB set is determined according to an RB set corresponding to a first RB in the first PRACH resource.

Optionally, the first RB includes the first one RB of the first PRACH resource; or the first RB includes the last one RB of the first PRACH resource; or the first RB includes the first one RB, which overlaps with an RB set, in the first PRACH resource; or the first RB includes the last one RB, which overlaps with an RB set, in the first PRACH resource.

Optionally, the first uplink BWP includes a plurality of RB sets, a first guard band is included between two adjacent RB sets of the plurality of RB sets, and the first RB does not overlap with the first guard band in the frequency domain.

Optionally, that the first RB set is determined according to the first PRACH resource includes: a starting position of the first RB set is determined according to a starting position of an RB set corresponding to the first PRACH resource; or the starting position of the first RB set is determined according to a starting position of an RB set corresponding to the first RB in the first PRACH resource.

Optionally, the first PRACH resource includes the first one PRACH resource in the PRACH resource configuration; or the first PRACH resource includes the last one PRACH resource in the PRACH resource configuration; or the first PRACH resource includes a PRACH resource for transmitting a PRACH by the terminal device.

Optionally, the number of RBs included in the first RB set is determined according to the number of RBs included in the initial uplink BWP; or the number of RBs included in the first RB set is determined according to a preset value; or the number of RBs included in the first RB set is determined according to a configuration parameter of the network device.

Optionally, the first scheduling information includes frequency domain resource allocation information used for indicating resource allocation determined according to the first RB set.

Optionally, the frequency domain resource allocation information includes interlace index indication information indicating a first interlace, and the first frequency domain resource includes an RB, which overlaps with the first interlace, in the first RB set.

Optionally, the first scheduling information includes at least one of: uplink grant information in a random access response (RAR), temporary cell radio network temporary identity (TC-RNTI) scrambled uplink grant information, and TC-RNTI scrambled downlink grant information.

Optionally, the first uplink channel includes at least one of: a message 3-physical uplink shared channel (Msg3-PUSCH) and a physical uplink control channel (PUCCH).

Optionally, the first uplink BWP includes an active uplink BWP in an RRC connected state.

Optionally, in some embodiments, the communication unit may be a communication interface or a transceiver, or an input/output interface of a communication chip or a system on a chip. The processing unit may be one or more processors.

It should be understood that the terminal device 300 in accordance with the embodiment of the present application may correspond to the terminal device in the method embodiment of the present application, and the above-mentioned and other operations and/or functions of various units in the terminal device 300 are respectively for implementing corresponding processes of the terminal device in the method 200 shown in FIG. 3, and will not be repeated herein for brevity.

Figure 8:
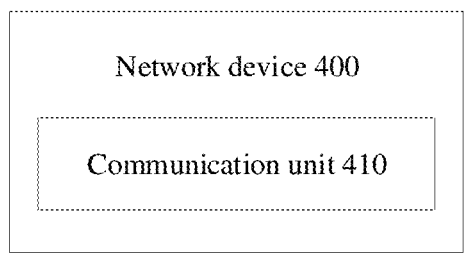
FIG. 8 is a schematic block diagram of a network device in accordance with an embodiment of the present application.

FIG. 8 shows a schematic block diagram of a network device 400 in accordance with an embodiment of the present application. As shown in FIG. 8, the network device 400 includes: a communication unit 410 configured to send first scheduling information to a terminal device, the first scheduling information being used for scheduling transmission of a first uplink channel by the terminal device through a first uplink bandwidth part (BWP), the first uplink BWP including one or more resource block (RB) sets, and the first uplink BWP corresponding to physical random access channel (PRACH) resource configuration, wherein at least one of the first scheduling information, an initial uplink BWP and a first PRACH resource in the PRACH resource configuration is used for the terminal device to determine to transmit the first uplink channel through a first frequency domain resource in a first RB set.

Optionally, in some embodiments, the first RB set is determined according to the first PRACH resource; or if the first uplink BWP includes the initial uplink BWP, the first RB set is an RB set included in the initial uplink BWP.

Optionally, in some embodiments, the first RB set is determined according to an RB set corresponding to a first RB in the first PRACH resource.

Optionally, the first RB includes the first one RB of the first PRACH resource; or the first RB includes the last one RB of the first PRACH resource; or the first RB includes the first one RB, which overlaps with an RB set, in the first PRACH resource; or the first RB includes the last one RB, which overlaps with an RB set, in the first PRACH resource.

Optionally, in some embodiments, the first uplink BWP includes a plurality of RB sets, a first guard band is included between two adjacent RB sets of the plurality of RB sets, and the first RB does not overlap with the first guard band in the frequency domain.

Optionally, that the first RB set is determined according to the first PRACH resource includes: a starting position of the first RB set is determined according to a starting position of an RB set corresponding to the first PRACH resource; or the starting position of the first RB set is determined according to a starting position of an RB set corresponding to the first RB in the first PRACH resource.

Optionally, the first PRACH resource includes the first one PRACH resource in the PRACH resource configuration; or the first PRACH resource includes the last one PRACH resource in the PRACH resource configuration; or the first PRACH resource includes a PRACH resource for transmitting a PRACH by the terminal device.

Optionally, in some embodiments, the number of RBs included in the first RB set is determined according to the number of RBs included in the initial uplink BWP; or the number of RBs included in the first RB set is determined according to a preset value; or the number of RBs included in the first RB set is determined according to a configuration parameter of the network device.

Optionally, in some embodiments, the first scheduling information includes frequency domain resource allocation information used for indicating resource allocation determined according to the first RB set.

Optionally, the frequency domain resource allocation information includes interlace index indication information indicating a first interlace, and the first frequency domain resource includes an RB, which overlaps with the first interlace, in the first RB set.

Optionally, in some embodiments, the first scheduling information includes at least one of: uplink grant information in a random access response (RAR), temporary cell radio network temporary identity (TC-RNTI) scrambled uplink grant information, and TC-RNTI scrambled downlink grant information.

Optionally, in some embodiments, the first uplink channel includes at least one of: a message 3-physical uplink shared channel (Msg3-PUSCH) and a physical uplink control channel (PUCCH).

Optionally, in some embodiments, the first uplink BWP includes an active uplink BWP in an RRC connected state.

Optionally, in some embodiments, the communication unit may be a communication interface or a transceiver, or an input/output interface of a communication chip or a system on a chip.

It should be understood that the network device 400 in accordance with the embodiment of the present application may correspond to the network device in the method embodiment of the present application, and the abovementioned and other operations and/or functions of various units in the network device 400 are respectively for implementing corresponding processes of the network device in the method 200 shown in FIG. 3, and will not be repeated herein for brevity.

Figure 9:
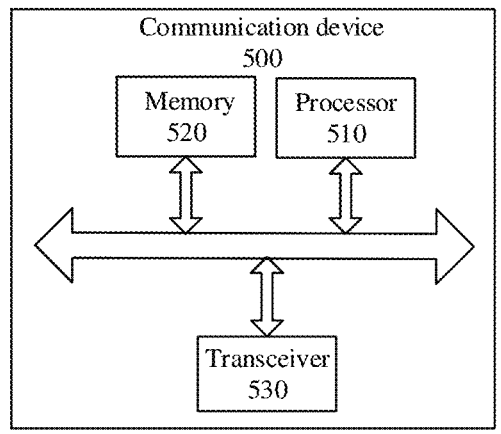
FIG. 9 is a schematic block diagram of a communication device in accordance with an embodiment of the present application.

FIG. 9 is a schematic structural diagram of a communication device 500 in accordance with an embodiment of the present application. The communication device 500 shown in FIG. 9 includes a processor 510, which may call and run a computer program from a memory to implement the methods in the embodiments of the present application.

Optionally, as shown in FIG. 9, the communication device 500 may further include a memory 520. The processor 510 may call and run a computer program from the memory 520 to implement the methods in the embodiments of the present application.

The memory 520 may be a separate device independent of the processor 510 or may be integrated in the processor 510.

Optionally, as shown in FIG. 9, the communication device 500 may further include a transceiver 530. The processor 510 may control the transceiver 530 to communicate with other devices, and specifically, to send information or data to other devices or receive information or data sent by other devices.

The transceiver 530 may include a transmitter and a receiver. The transceiver 530 may further include antennas, the number of which may be one or more.

Optionally, the communication device 500 may specifically be the network device in accordance with the embodiment of the present application, and the communication device 500 may implement the corresponding processes implemented by the network device in various methods in the embodiments of the present application, which will not be repeated herein for brevity.

Optionally, the communication device 500 may specifically be the mobile terminal/terminal device in accordance with the embodiment of the present application, and the communication device 500 may implement the corresponding processes implemented by the mobile terminal/terminal device in various methods in the embodiments of the present application, which will not be repeated herein for brevity.

Figure 10:
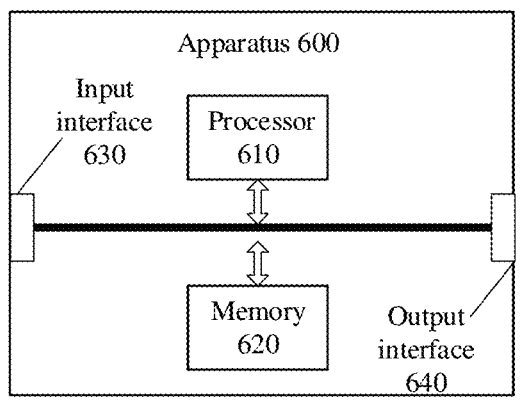
FIG. 10 is a schematic block diagram of an apparatus in accordance with an embodiment of the present application.

FIG. 10 is a schematic structural diagram of an apparatus in accordance with an embodiment of the present application. The apparatus 600 shown in FIG. 10 includes a processor 610. The processor 610 may call and run a computer program from a memory to implement the methods in the embodiments of the present application.

Optionally, as shown in FIG. 10, the apparatus 600 may further include a memory 620. The processor 610 may call and run a computer program from the memory 620 to implement the methods in the embodiments of the present application.

The memory 620 may be a separate device independent of the processor 610 or may be integrated in the processor 610.

Optionally, the apparatus 600 may further include an input interface 630. The processor 610 may control the input interface 630 to communicate with other devices or chips, and specifically, to acquire information or data sent by other devices or chips.

Optionally, the apparatus 600 may further include an output interface 640. The processor 610 may control the output interface 640 to communicate with other devices or chips, and specifically, to output information or data to other devices or chips.

Optionally, the apparatus may be applied to the network device in the embodiments of the present application, and the apparatus may implement the corresponding processes implemented by the network device in various methods in the embodiments of the present application, which will not be repeated herein for brevity.

Optionally, the apparatus may be applied to the mobile terminal/terminal device in the embodiments of the present application, and the apparatus may implement the corresponding processes implemented by the mobile terminal/terminal device in various methods in the embodiments of the present application, which will not be repeated herein for brevity.

Optionally, the apparatus mentioned in the embodiments of the present application may be a chip, such as a system-level chip, a system chip, a chip system, or a chip on which a system is deployed, etc.

Figure 11:
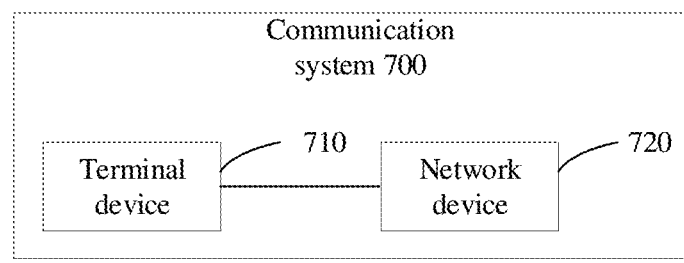
FIG. 11 is a schematic block diagram of a communication system in accordance with an embodiment of the present application.

FIG. 11 is a schematic block diagram of a communication system 700 in accordance with an embodiment of the present application. As shown in FIG. 11, the communication system 700 includes a terminal device 710 and a network device 720.

The terminal device 710 may be configured to implement the corresponding functions implemented by the terminal device in the above-mentioned methods, and the network device 720 may be configured to implement the corresponding functions implemented by the network device in the above-mentioned methods, which will not be repeated herein for brevity.

It should be understood that the processor in the embodiments of the present application may be an integrated circuit chip having a signal processing capability. In an implementation process, each of the steps of the foregoing method embodiments may be implemented through an integrated logic circuit of hardware in the processor or instructions in a form of software. The processor described above may be a general purpose processor, a digital signal processor (DSP), an application specific integrated circuit (ASIC), a field programmable gate array (FPGA) or other programmable logic devices, a discrete gate or a transistor logic device, or a discrete hardware component. The processor may implement or perform various methods, steps and logical block diagrams disclosed in the embodiments of the present application. The general purpose processor may be a microprocessor, or the processor may be any conventional processor or the like. The steps of the methods disclosed in combination with the embodiments of the present application may be directly embodied to be accomplished by a hardware decoding processor, or accomplished by a combination of hardware and software modules in the decoding processor. The software modules may be located in a storage medium which is mature in the art, such as a random access memory, a flash memory, a read-only memory, a programmable read-only memory, an electrically erasable programmable memory, a register, etc. The storage medium is located in the memory, and the processor reads information in the memory and completes the steps of the foregoing methods in combination with its hardware.

It may be understood that the memory in the embodiments of the present application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which is used as an external cache. As an example rather than limitation, many forms of RAMs may be used, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM) and a direct Rambus random access memory (DR RAM). It should be noted that the memory in the systems and methods described in the present disclosure is intended to include, but not limited to, these and any other suitable types of memories.

It should be understood that the above memories are described as examples rather than limitations. For example, the memory in the embodiments of the present application may be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a direct Rambus RAM (DR RAM), etc. That is, the memory in the embodiments of the present application is intended to include, but not limited to, these and any other suitable types of memories.

The embodiments of the present application further provide a computer readable storage medium for storing a computer program.

Optionally, the computer readable storage medium may be applied to the network device in the embodiments of the present application, and the computer program causes a computer to perform the corresponding processes implemented by the network device in various methods in accordance with the embodiments of the present application, which will not be repeated herein for brevity.

Optionally, the computer readable storage medium may be applied to the mobile terminal/terminal device in the embodiments of the present application, and the computer program causes a computer to perform the corresponding processes implemented by the mobile terminal/terminal device in various methods in accordance with the embodiments of the present application, which will not be repeated herein for brevity.

The embodiments of the present application further provide a computer program product including computer program instructions.

Optionally, the computer program product may be applied to the network device in the embodiments of the present application, and the computer program instructions cause a computer to perform the corresponding processes implemented by the network device in various methods in accordance with the embodiments of the present application, which will not be repeated herein for brevity.

Optionally, the computer program product may be applied to the mobile terminal/terminal device in the embodiments of the present application, and the computer program instructions cause a computer to perform the corresponding processes implemented by the mobile terminal/terminal device in various methods in accordance with the embodiments of the present application, which will not be repeated herein for brevity.

The embodiments of the present application further provide a computer program.

Optionally, the computer program may be applied to the network device in the embodiments of the present application. The computer program, when running on a computer, causes the computer to perform the corresponding processes implemented by the network device in various methods in accordance with the embodiments of the present application, which will not be repeated herein for brevity.

Optionally, the computer program may be applied to the mobile terminal/terminal device in the embodiments of the present application. The computer program, when running on a computer, causes the computer to perform the corresponding processes implemented by the mobile terminal/terminal device in various methods in accordance with the embodiments of the present application, which will not be repeated herein for brevity.

A person of ordinary skill in the art may recognize that the elements and algorithm steps in various examples described in combination with the embodiments disclosed herein can be implemented by electronic hardware, or a combination of computer software and electronic hardware. Whether these functions are implemented by way of hardware or software depends on the specific applications and design constraints of the technical schemes. Skilled artisans may use different methods to implement the described functions for each particular application, but such implementation should not be considered to be beyond the scope of the present application.

Those skilled in the art may clearly understand that for the sake of convenience and conciseness of description, the specific working processes of the systems, devices and units described above may refer to the corresponding processes in the above method embodiments and will not be repeated herein.

In several embodiments provided by the present application, it should be understood that the disclosed systems, devices and methods may be implemented in other ways. For example, the device embodiments described above are only illustrative, for example, the division of the units is only a logical function division, and there may be other division manners in actual implementation. For example, multiple units or components may be combined or integrated into another system, or some features may be ignored or not executed. In addition, the shown or discussed coupling or direct coupling or communication connection between one another may be an indirect coupling or communication connection through some interfaces, devices or units, and may be in electrical, mechanical or other forms.

The units described as separate components may be or may be not physically separated, and the component shown as a unit may be or may be not a physical unit, i.e., it may be located in one place or may be distributed on multiple network units. Part or all of the units may be selected according to actual needs to achieve the purpose of the technical schemes of the embodiments.

In addition, various functional units in various embodiments of the present application may be integrated into one processing unit, or may be physically separate, or two or more than two units may be integrated into one unit.

The functions, if implemented in a form of software functional units and sold or used as an independent product, may be stored in a computer readable storage medium. Based on such understanding, the technical schemes of the present application, in essence, or the part which contributes to the prior art, or part of the technical schemes, may be embodied in the form of a software product, which is stored in a storage medium including a number of instructions for causing a computer device (which may be a personal computer, a server or a network device, etc.) to perform all or part of the steps of various embodiments of the present application. The aforementioned storage medium includes various media capable of storing program codes, such as a U disk, a mobile hard disk, a read-only memory (ROM), a random access memory (RAM), a magnetic disk, or an optical disk, etc.

What are described above are merely particular implementations of the present application, but the protection scope of the present application is not limited thereto. Any variation or substitution that may easily be conceived of by a person skilled in the art within the technical scope disclosed by the present application shall be included within the protection scope of the present application. Therefore, the protection scope of the present application shall be subject to the protection scope of the claims.

The invention claimed is:

1. A wireless communication method comprising:
receiving, by a terminal device, first scheduling information sent by a network device, the first scheduling information being used for scheduling transmission of a first uplink channel by the terminal device through a first uplink bandwidth part (BWP), the first uplink BWP comprising one or more resource block (RB) sets, and the first uplink BWP corresponding to physical random access channel (PRACH) resource configuration; and
determining, by the terminal device, to transmit the first uplink channel through a first frequency domain resource in a first RB set according to a first PRACH resource in the PRACH resource configuration,
wherein the first RB set is determined according to the first PRACH resource; and
wherein the first uplink BWP comprises a plurality of RB sets, a guard band within a carrier is comprised between two adjacent RB sets of the plurality of RB sets, and a size of the guard band within the carrier is acquired according to a protocol.

2. The method according to claim 1, wherein that the first RB set is determined according to the first PRACH resource comprises:
a starting position of the first RB set is the same as a starting position of an RB set corresponding to the first PRACH resource.

3. The method according to claim 1, wherein the first PRACH resource comprises a PRACH resource for transmitting a PRACH by the terminal device.

4. The method according to claim 1, wherein the number of RBs comprised in the first RB set is determined according to a preset value.

5. The method according to claim 1, wherein the first uplink channel comprises a message 3-physical uplink shared channel (Msg3-PUSCH).

6. The method according to claim 1, wherein the first uplink BWP comprises an active uplink BWP in a Radio Resource Control (RRC) connected state.

7. A terminal device comprising a processor and a memory, wherein the memory is configured to store a computer program, and the processor is configured to call and run the computer program stored in the memory to perform the method according to claim 1.

8. A non-transitory computer-readable storage medium configured to store a computer program, the computer program enabling a computer to perform the method according to claim 1.

9. A wireless communication method comprising:
sending, by a network device, first scheduling information to a terminal device, the first scheduling information being used for scheduling transmission of a first uplink channel by the terminal device through a first uplink bandwidth part (BWP), the first uplink BWP comprising one or more resource block (RB) sets, and the first uplink BWP corresponding to physical random access channel (PRACH) resource configuration, wherein a first PRACH resource in the PRACH resource configuration is used for the terminal device to determine to transmit the first uplink channel through a first frequency domain resource in a first RB set,
wherein the first RB set is determined according to the first PRACH resource; and
wherein the first uplink BWP comprises a plurality of RB sets, a guard band within a carrier is comprised between two adjacent RB sets of the plurality of RB sets, and a size of the guard band within the carrier is acquired according to a protocol.

10. The method according to claim 9, wherein that the first RB set is determined according to the first PRACH resource comprises:
    a starting position of the first RB set is the same as a starting position of an RB set corresponding to the first PRACH resource.

11. The method according to claim 9, wherein the first PRACH resource comprises a PRACH resource for transmitting a PRACH by the terminal device.

12. The method according to claim 9, wherein the number of RBs comprised in the first RB set is determined according to a preset value.

13. The method according to claim 9, wherein the first uplink channel comprises a message 3-physical uplink shared channel (Msg3-PUSCH).

14. The method according to claim 9, wherein the first uplink BWP comprises an active uplink BWP in a Radio Resource Control (RRC) connected state.

15. A network device comprising a processor and a memory, wherein the memory is configured to store a computer program, and the processor is configured to call and run the computer program stored in the memory to perform the method according to claim 9.

16. A non-transitory computer-readable storage medium configured to store a computer program, the computer program enabling a computer to perform the method according to claim 9.

\* \* \* \* \*